(12) United States Patent
Kato

(10) Patent No.: US 6,708,815 B2
(45) Date of Patent: Mar. 23, 2004

(54) ARTICLE CONVEYOR DEVICE

(75) Inventor: Heizaburo Kato, Shizuoka (JP)

(73) Assignee: Sankyo Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/186,084

(22) Filed: Jun. 28, 2002

(65) Prior Publication Data

US 2003/0015403 A1 Jan. 23, 2003

(30) Foreign Application Priority Data

Jul. 23, 2001 (JP) ........................................ 2001-222043

(51) Int. Cl.[7] .............................................. B65G 25/04
(52) U.S. Cl. ..................................... 198/750.8; 198/766
(58) Field of Search ........................... 198/750.1, 750.8, 198/766, 750.14

(56) References Cited

U.S. PATENT DOCUMENTS

| | | | | |
|---|---|---|---|---|
| 4,243,132 A | * | 1/1981 | Miyakoshi et al. | ..... 198/766 X |
| 4,724,949 A | | 2/1988 | Misina | ................... 198/766 X |
| 5,178,258 A | | 1/1993 | Smalley et al. | ......... 198/766 X |
| 5,542,804 A | * | 8/1996 | Merkle et al. | ....... 198/750.8 X |
| 6,598,733 B2 | * | 7/2003 | Kato | ................... 198/750.8 X |

FOREIGN PATENT DOCUMENTS

| | | | |
|---|---|---|---|
| DE | 1 280 738 | 10/1968 | |
| GB | 953412 | 3/1964 | |
| GB | 1141123 | 1/1969 | |
| JP | 58-006810 | 1/1983 | |
| JP | 4-55209 | * 2/1992 | .............. 198/750.8 |
| SU | 933572 | * 6/1982 | .............. 198/750.8 |

OTHER PUBLICATIONS

European Search Report EP 02 25 4567 dated Nov. 18, 2002.

* cited by examiner

*Primary Examiner*—James R. Bidwell
(74) *Attorney, Agent, or Firm*—Harness, Dickey & Pierce, PLC

(57) ABSTRACT

There is provided an article conveyor device which may effectively convey an article by a cam drive. The article conveyor device comprises a reciprocating portion which reciprocates by being driven by a cam, and an article conveyor portion for conveying an article, having an inclination of a predetermined angle in respect to a reciprocating direction of the reciprocating portion in a vertical plane, and cooperating with the reciprocating portion; and conveys an article along the article conveyor portion by the reciprocating motion of the reciprocating portion.

5 Claims, 7 Drawing Sheets

ARTICLE CONVEYOR DEVICE

BACKGROUND OF THE INVENTION

The present application claims priority upon Japanese Patent Application No. 2001-222043 filed on Jul. 23, 2001, which is herein incorporated by reference.

1. Field of the Invention

The present invention is related to an article conveyor device.

2. Related Art

Conventionally, there have been proposed various devices to convey and align articles such as so-called unpackaged parts, and to feed them one by one. These devices are generally referred to as a "parts feeder". There are various types of parts feeders such as a vibratory type, a rotating type, an oscillating type, a belt type, and a shaking type, in which a vibratory parts feeder is the most common. This vibratory parts feeder is a device where articles to be conveyed are placed on a vibrating surface, and by use of a relative slip and jump phenomenon between the articles and the vibrating surface, alignment and conveying of the articles are performed.

An exemplary example of a linear vibratory parts feeder is described referring to FIG. 7. As shown in FIG. 7, a plate is supported in a state biased by a few pairs of flat springs in respect to a base. Further, the base is provided with an electromagnet, and a stay integrally provided with the plate may be drawn near by this electromagnet. Therefore, if an alternating voltage with a predetermined frequency is applied to the electromagnet, the flat springs vibrate in the directions B according to the frequency. In this way, the article (work) accommodated on the plate is appropriately conveyed in a direction A in the figure.

However, a vibratory parts feeder having such a structure has various problems. For example, the problems are such as a lot of time in adjustment to efficiently carry out article conveyance, magnetization of the work, and generation of noise. In particular, regarding noise, in the case of a vibratory parts feeder with the above described structure, the work is made to jump in respect to the plate and conveyed, thus noise is generated when the work lands on the plate.

In view of the above problems, there is proposed a vibratory parts feeder using a cam, for example, such as that shown in Japanese Unexamined Patent Publication No. Sho 58-6810 (Japanese Examined Patent Publication No. Sho 63-24891). A device described therein has a bowl supported rotatably about a center shaft The bowl is rotated while horizontally vibrated by a cam so that a significant difference in accelerations for back and forth strokes exists, so as to convey the work inside it using friction force and inertial force.

In this device, since a cam is used, and the bowl horizontally oscillates and does not reciprocate in an up-and-down direction, the work does not jump on the bowl, and thus this device is advantageous in that a conventional problem regarding noise may be eased. However, since with this device the bowl horizontally oscillates and does not reciprocally move in the up-and-down direction, the work on the bowl is always contacted toward the bowl with a predetermined force by gravity.

In order to efficiently convey the work, it is preferable for a contact pressure of the work in respect to a work convey surface to vary depending on a direction of the work convey surface movement, i.e., in the case the work convey surface moves in the conveying direction of the work, and in the case the work convey surface moves in an opposite direction to the above. In other words, it is preferable at the time the work convey surface moves in the conveying direction of the work, to make the work contact against the work convey surface with a stronger force, to suppress sliding of the work in respect to the work convey surface and to actively convey the work, whereas, it is preferable at the time the work convey surface moves in an opposite direction to a conveying direction of the work, to make the work contact against the work convey surface with a slighter force, to encourage the work to slide in respect to the work convey surface and to suppress the work from returning to an opposite direction of the conveying direction of the work.

SUMMARY OF THE INVENTION

The present invention is made in view of the above problems, and one object of the present invention is to provide an article conveyor device which may effectively convey an article by a cam drive.

One aspect of the present invention for achieving the above and other objects is an article conveyor device comprising:

a reciprocating portion which is driven by a cam to reciprocate; and an article conveyor portion for conveying an article being inclined by a predetermined angle in respect to a reciprocating direction of the reciprocating portion in a vertical plane, and cooperating with the reciprocating portion;

wherein the article is conveyed along the article conveyor portion by a reciprocating motion of the reciprocating portion.

For example, the article conveyor portion may be set in a horizontal state.

At the time the article conveyor portion reciprocates from a first position diagonally upwards to reach a second position, and from the second position diagonally downwards to reach the first position, a time taken for the article conveyor portion to move from the first position to the second position, may be longer than a time taken for the article conveyor portion to move from the second position to the first position.

The article conveyor portion may travel at a constant speed for a predetermined time period while the article conveyor portion moves from the first position to the second position.

The cam may rotate with an input shaft which is made to rotate by a driving means, and may comprise a cam portion formed by ribs along a rotating direction of the input shaft, and the reciprocating portion may comprise a first cam follower and a second cam follower which respectively contact the rib from both sides.

The reciprocating portion is supported on a housing by means of slide guides, and is guided by the slide guides to reciprocate.

BRIEF DESCRIPTION OF THE DRAWINGS

Embodiments of the present invention will now be described by way of further example only and with reference to the accompanying drawings, in which.

DETAILED DESCRIPTION OF PREFERRED EMBODIMENTS

Summary of Article Conveyor Device

Figure 1A:
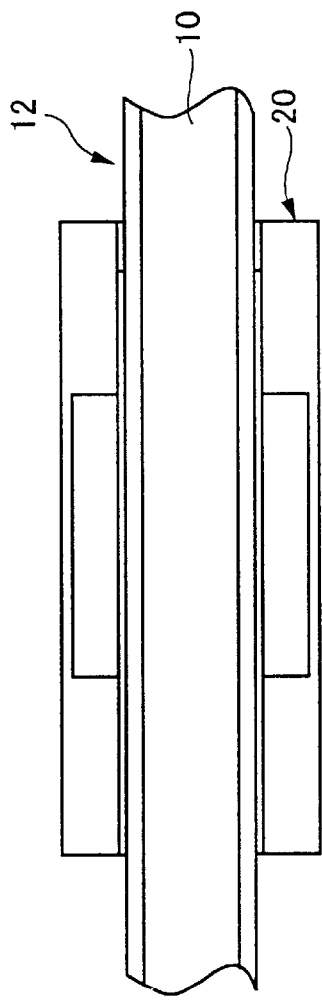
FIGS. 1A–1C are diagrams showing an overview of an article conveyor device.
Figure 1C:
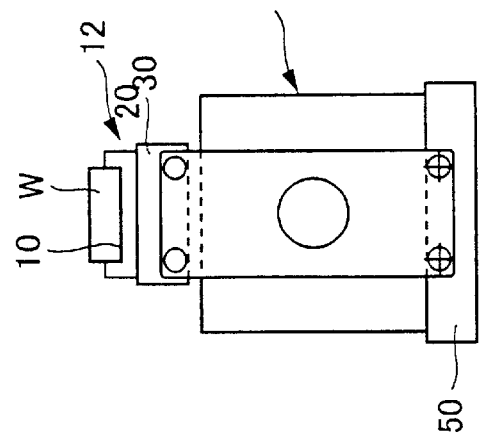
Figure 1B:
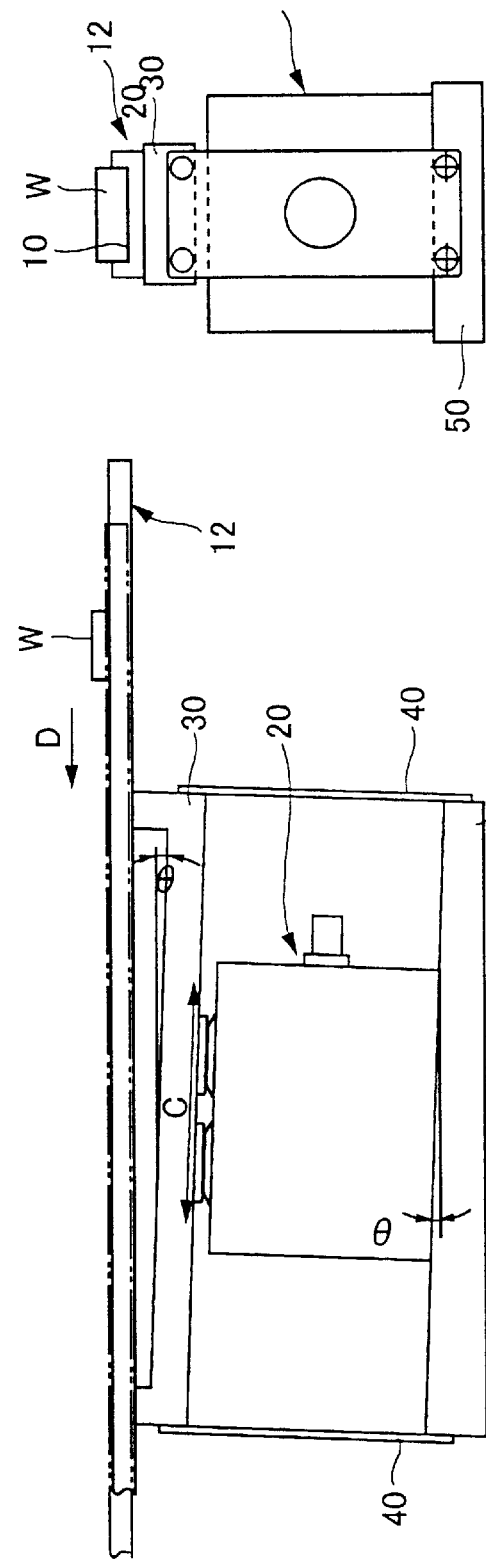

A structure of an article conveyor device according to the present embodiment is explained referring to FIGS. 1A–1C. FIGS. 1A–1C are diagrams showing an overview of an article conveyor device. FIG. 1A is a top view of the device, FIG. 1B is a front view of the device, and FIG. 1C is a side view of the device.

An article conveyor device shown in FIGS. 1A-LC comprises an article conveyor member 12, an article conveyor portion 10 provided on the article conveyor member 12, and a cam device 20.

The cam device 20 has a reciprocating portion 30, flat springs 40 as supporting members, and a housing 50. One end of the flat springs 40 are attached to a housing 50, and the other ends are attached to the reciprocating portion 30. In this way, the reciprocating portion 30 is supported on the housing 50 via the flat springs 40, and may reciprocate in directions C in FIG. 1B.

The reciprocating portion 30 supports the article conveyor member 12. Various methods are used for supporting the article conveyor member 12, such as screw fastening and bonding the article conveyor member 12 to the reciprocating portion 30.

The article conveyor portion 10 is used for conveying articles, and in the example shown in FIG. 1, it is a groove formed in the article conveyor member 12. The article conveyor portion 10, is provided in a horizontal state being inclined by angle θ, in respect to the directions C in the figure which are moving directions of the reciprocating portion 30, in a vertical plane, and cooperates with a reciprocating motion of the reciprocating portion 30. Note that, the article conveyor portion 10 may be structured in various ways, not limited to a case where it is constituted as a groove formed in the article conveyor member 12, and as long as it cooperates with the reciprocating motion of the reciprocating portion 30, it may be constituted as a separate part to the article conveyor member 12 and fixed to the article conveyor member 12, or the like.

With the article conveyor device constituted in this way, when the reciprocating portion 30 reciprocates, the article conveyor member 12 reciprocates between a position shown by a dash-double-dot line and a position shown by a solid line (at this time, the article conveyor portion 10 also reciprocates), thus the article W is conveyed in a direction D in the figure along the article conveyor portion 10.

Structure of Cam Device 20

Figure 2C:
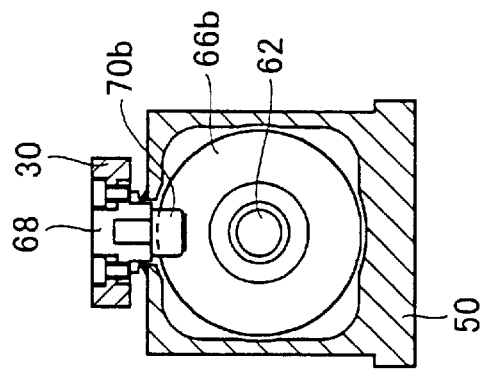
FIGS. 2A–2C are diagrams showing a structure of a cam device.
Figure 2A:
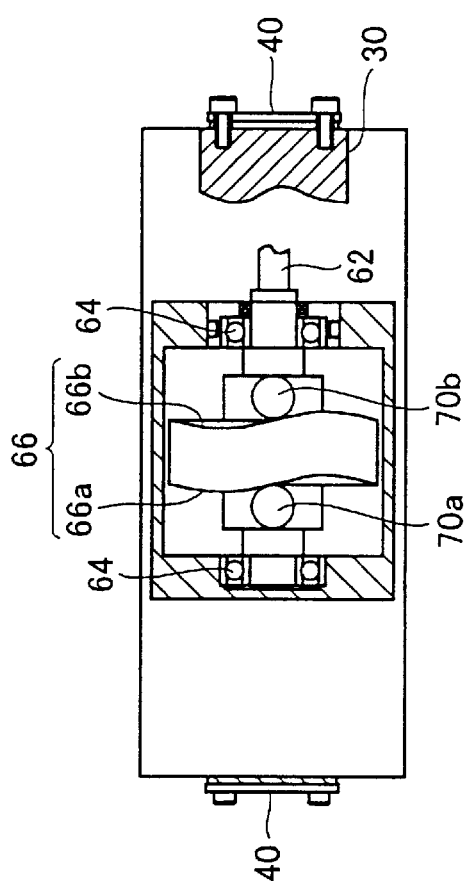
Figure 2B:
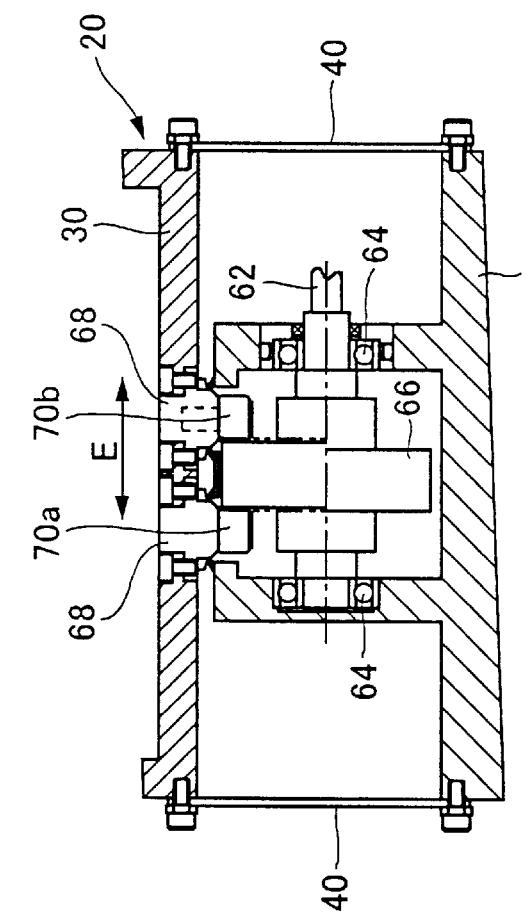
Figure 3B:
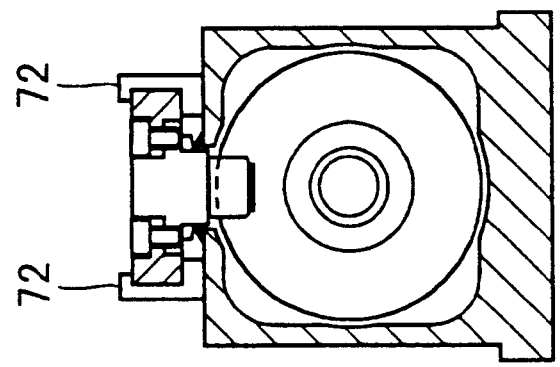
FIGS. 3A–3B are diagrams showing a modified example of the cam device.
Figure 3A:
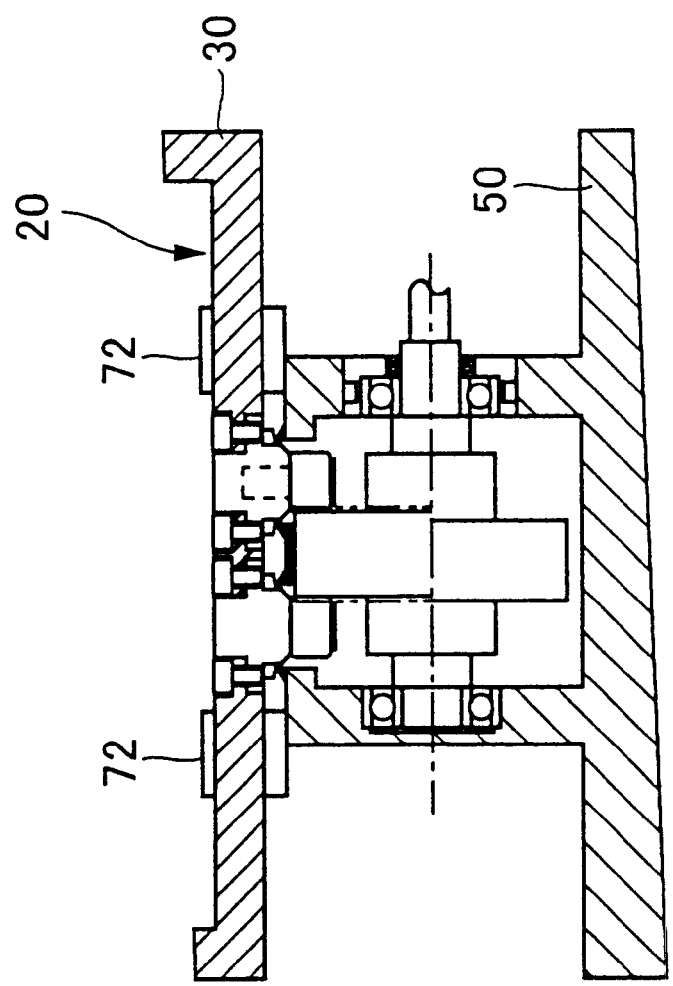

Next, a structure of a cam device 20 is described referring to FIGS. 2A, 2B, 2C, 3A, and 3B. FIGS. 2A–2C are diagrams showing a constitution of a cam device 20. FIG. 2A is a top view of the cam device 20, FIG. 2B is a front view of the cam device 20, and FIG. 2C is a side view of the cam device 20. FIGS. 3A and 3B are diagrams showing a modified example of a constitution of the cam device 20.

FIG. 3A is a front view of a modified example of the cam device 20, and FIG. 3B is a side view of the modified example of the cam device 20.

An input shaft 62 is rotatably supported in respect to a housing 50 via a bearing 64. This input shaft 62 rotates by being driven by a drive source (not shown) such as a motor.

A cam 66 is integrally formed with the input shaft 62 along a rotating direction of the input shaft 62, and rotates with the same. The cam 66 comprises a cam portion formed by a rib along the rotating direction of the input shaft 62, and the rib which is the cam portion has a first cam portion 66a at one side surface, and a second cam portion 66b at the other side surface. Note that, the cam 66 is to be constituted to rotate with the input shaft 62, and may be structured by the same member as the input shaft 62, or structured as a separate member and then fixed to the input shaft 62.

One end of the flat springs 40 are fixed to the housing 50, and the other ends are fixed to the reciprocating portion 30. In this way, the reciprocating portion may reciprocate in a direction E in FIG. 2B. Note that, the direction E in FIG. 2B is the same as the direction C in FIG. 1.

A cam follower supporting block 68 is fixed to the reciprocating portion 30 by bolts or the like, and the cam follower supporting block 68 is provided with a first cam follower 70a and a second cam follower 70b. The first cam follower 70a is provided corresponding to the first cam portion 66a, and the second cam follower 70b is provided corresponding to the second cam portion 66b. The first cam follower 70a and the second cam follower 70b respectively contact the rib forming the cam portion from both sides. Namely, the first cam follower 70a contacts the first cam portion 66a, and the second cam follower 70b contacts the second cam portion 66b. With such a structure, a pre-compressed state is created where backlash can be avoided. Therefore, with a simple mechanism, the cam device provided in the article conveyor device may be made faster, with higher precision, and greater rigidity.

Further, when the first cam portion 66a presses the first cam follower 70a, the first cam follower 70a is prevented from detaching (jumping) from the first cam portion 66a by the second cam portion 66b and the second cam follower 70b, and when the second cam portion 66b presses the second cam follower 70b, the second cam follower 70b is prevented from detaching (jumping) from the second cam portion 66b by the first cam portion 66a and the first cam follower 70a.

In this way, the first cam follower 70a (second cam follower 70b) is prevented from jumping from the first cam portion 66a (second cam portion 66b), and as a result, a less noisy article conveyor device than a conventional device may be realized.

Further, in the above described example, the cam portion is formed by a rib along a rotating direction of the input shaft 62, but it may be a structure where a cam portion is formed by a groove along a rotating direction of the input shaft 62, and cam followers engaging such a groove are provided. With such a structure, a similar effect may be obtained. However, if a space is generated between the groove and the cam follower, there is a possibility of occurrence of a little backlash, thus a structure where the cam portion is formed by a rib is more preferable.

Further, the first cam follower 70a and the second cam follower 70b may be directly fixed to the reciprocating portion 30 without providing the cam follower supporting block 68.

In the example shown in FIGS. 2A–2C, the flat springs 40 are used as supporting members, but as in the modified example shown in FIGS. 3A–3B, slide guides 72 may be used as supporting members. In the example shown in FIGS. 3A–3B, the reciprocating moving member 30 is reciprocally movably supported in respect to the housing 50 via the slide guides 72, and is guided by the slide guides 72 to reciprocate. In this way, when the slide guides 72 are used as supporting members, compared to a case in which the flat springs 40 are used as supporting members, it becomes possible to further reduce noise generation. Note that, the structure of other parts than the cam device 20 shown in FIGS. 3A–3B, are the same as that shown in FIGS. 2A–2C, therefore explanation is omitted.

Article Conveying Operation of Article Conveyor Device

Figure 4:
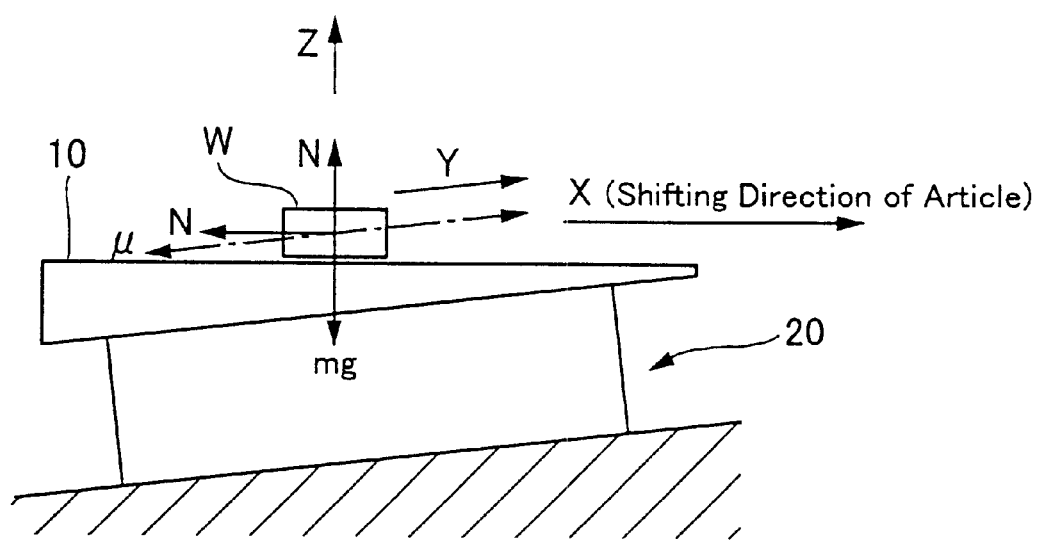
FIG. 4 is a diagram schematically showing a force applied to an article W.

An article conveying operation of an article conveyor device according to this embodiment is described referring to FIGS. 4, 5A–5E and 6. FIG. 4 is a diagram schematically showing a force applying to an article W. FIGS. 5A–5E are timing charts of an operation of an article conveyor portion 10. FIGS. 6A–6B are diagrams schematically showing a force applying to the article W taking into consideration positive and negative acceleration.

The article conveying operation of the article conveyor device according to this embodiment is described below, and the reason an effective article conveying operation such as described below may be realized by just one cam 66, is in that as described above the article conveyor portion 10 is provided in a horizontal state as being inclined by angle θ, in a vertical plane, in respect to moving directions (the direction C in FIG. 1) of the reciprocating portion 30 which is driven by just one cam.

By setting the article conveyor portion 10 in a horizontal state as being inclined by θ in respect to a moving direction of the reciprocating portion 30, a preferable article conveying operation may be realized while maintaining the article conveyor portion 10 in a horizontal state, utilizing a horizontal component and a vertical component of the movement of the article conveyor portion 10, and varying the contact pressure of the article W in respect to the article conveyor portion 10. For example, in the case the article conveyor portion 10 is set in a horizontal state without an inclination of θ in respect to moving directions of the reciprocating portion 30, the article conveyor portion 10 only reciprocates in a horizontal direction, and movements in a vertical direction do not occur, thus, the contact pressure of the article W in respect to the article conveyor portion 10 does not vary.

Assuming a more superior structure which is not seen in such conventional structures, the article conveying operation of the article conveyor device according to this embodiment is described in detail below.

As shown in FIG. 4, gravity mg, drag N due to the article conveyor portion 10, and friction force $\mu N$ apply to the article W. Note that, the dash-double-dot line shows a reciprocating direction of the article conveyor portion 10 and the article conveyor member 12, and has a positive movement in a direction Y. Further, a horizontal right direction is a direction X and a vertical upward direction is a direction Z. The direction X is also a shifting direction of the article W.

Figure 5A:
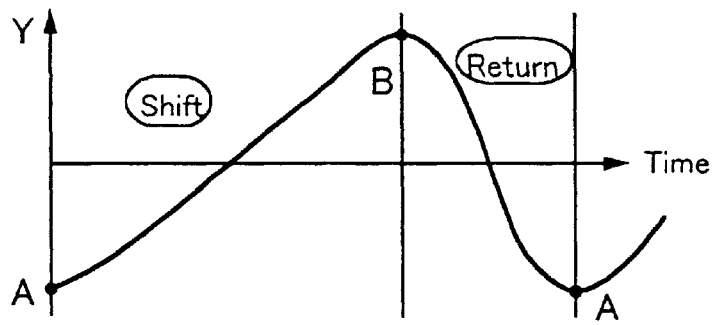
FIGS. 5A–5E are timing charts of operations of an article conveyor portion 10.
Figure 5B:
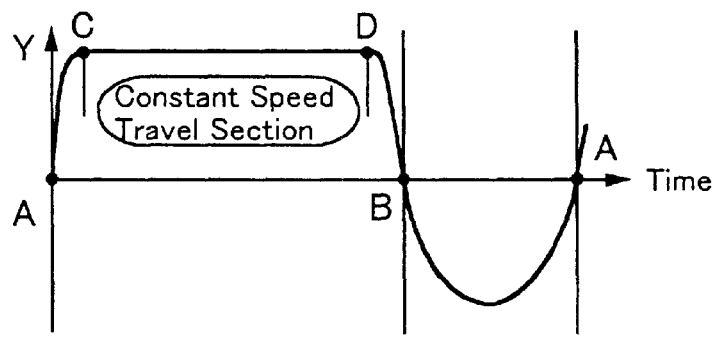
Figure 5C:
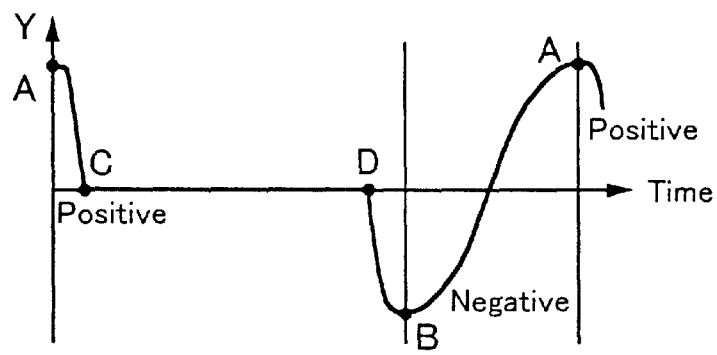
Figure 5D:
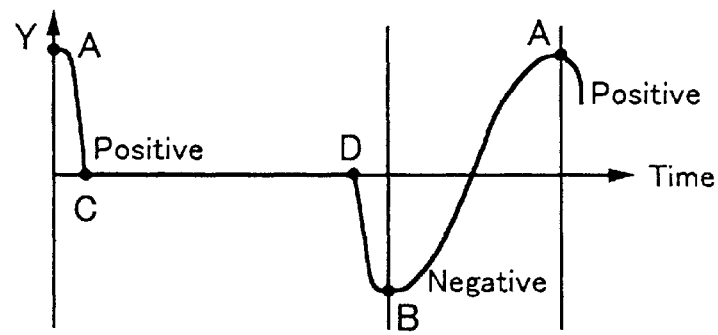
Figure 5E:
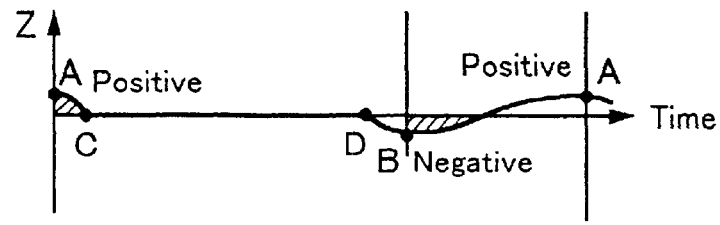

FIG. 5A is a timing chart of a Y direction displacement of the article conveyor portion 10, FIG. 5B is a timing chart of a Y direction speed of the article conveyor portion 10, FIG. 5C is a timing chart of a Y direction acceleration of the article conveyor portion 10, FIG. 5D is a timing chart of an X direction component of a Y direction acceleration on the article conveyor portion 10, and FIG. 5E is a timing chart of a Z direction component of a Y direction acceleration on the article conveyor portion 10. Note that, as described above, the article conveyor portion 10 is a groove formed in the article conveyor member 12, and the article conveyor member 12 is supported to the reciprocating portion 30 in a manner such as screw fastening, so that the article conveyor member 12 and the reciprocating portion 30 move by a similar timing chart to the timing chart shown in FIGS. 5A–5E.

Figure 6B:
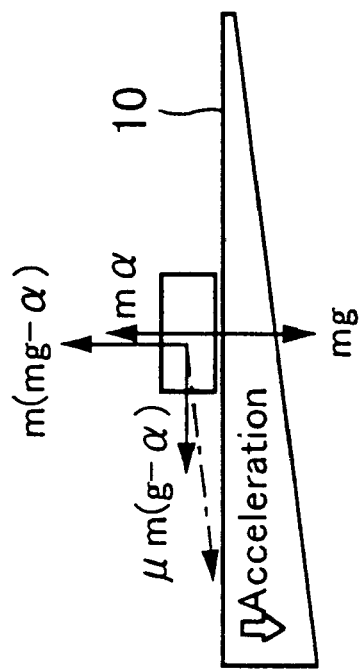
FIGS. 6A–6B are diagrams schematically showing a force applied to the article W, in consideration of the positive and negative acceleration.
Figure 6A:
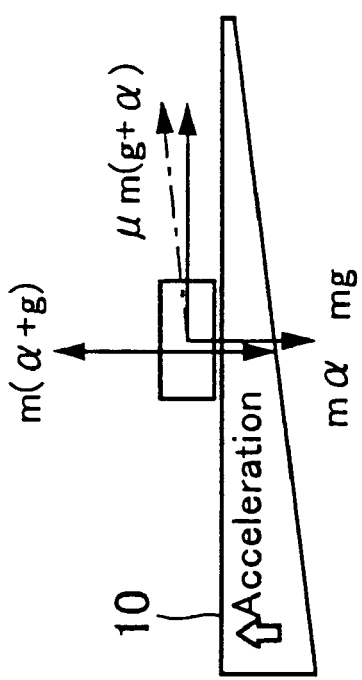
Figure 7:
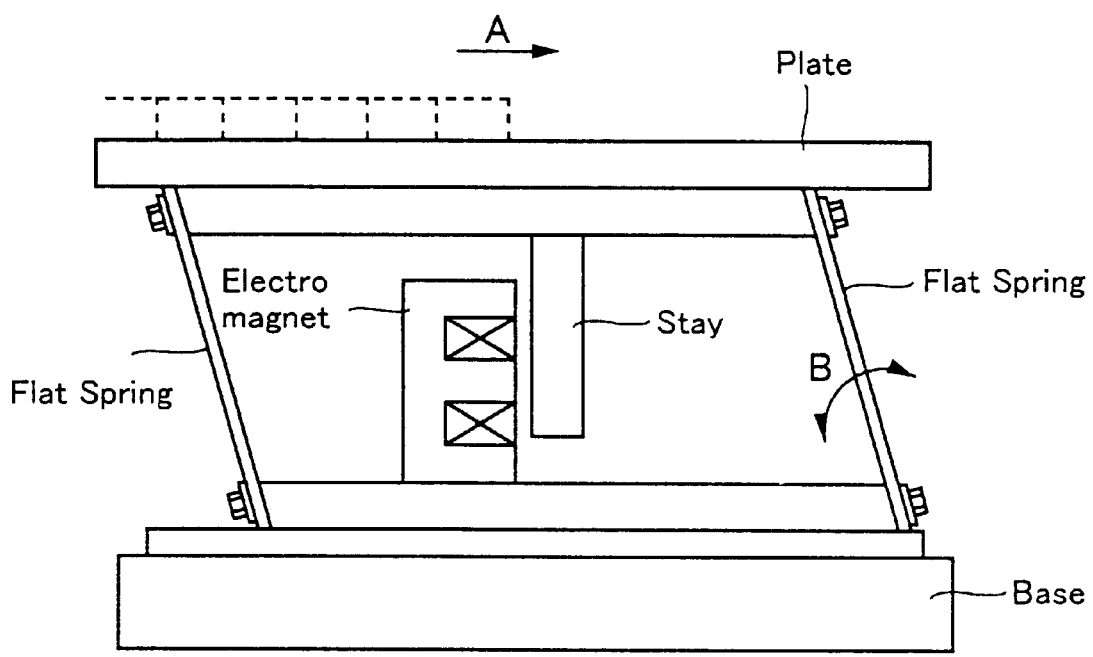
FIG. 7 is a diagram showing an exemplary structure of a linear vibratory parts feeder.

As shown in the timing charts of FIGS. 5A–5E, a force applying to article W, in the case the article conveyor portion 10 reciprocates from position A diagonally upwards to reach position B and from position B diagonally downwards to reach position A, is described in more detail referring to FIGS. 6A–6B. As shown in FIG. 5E, the acceleration in the direction Z of the article conveyor portion 10 is a positive value near position A, and a negative value near position B. In the case the acceleration in the Z direction of the article conveyor portion 10 is a positive value α, when seeing the article W from the article conveyor portion 10, as shown in FIG. 6A, a friction force $\mu m(g+\alpha)$ applies to the article W. On the other hand, in the case the acceleration in the Z direction of the article conveyor portion 10 is a negative value $(-\alpha)$, when seeing the article W from the article conveyor portion 10, as shown in FIG. 6B, a friction force $\mu m(g-\alpha)$ applies to the article W. Therefore, a larger friction force is applied in the case where the acceleration in the Z direction of the article conveyor portion 10 becomes a positive value, than in the case where the acceleration in the Z direction of the article conveyor portion 10 becomes a negative value. Namely, it is harder for the article W to slide against the article conveyor portion 10 in the case the acceleration in the Z direction of the article conveyor portion 10 is a positive value (near position A), than in the case the acceleration in the Z direction of the article conveyor portion 10 is a negative value (near position B).

Based on the above considerations, the conveying operation of the article W, in the case the article conveyor portion 10 reciprocates according to the timing charts shown in FIGS. 5A–5E, is described.

Firstly, as is apparent from the timing charts shown in FIGS. 5A–5E, at the time the article conveyor portion 10 reciprocates from position A diagonally upwards to reach position B and from position B diagonally downwards to reach position A, a time taken for the article conveyor portion 10 to move from position A to position B is longer than a time taken for the article conveyor portion 10 to move from position B to position A. For this reason, as compared to a case where a time taken for the article conveyor portion 10 to move from position A to position B is the same as a time taken to move from position B to position A, an absolute value of acceleration at point B and point A become larger.

Therefore, in view of the fact that the article W easily slides in respect to the article conveyor portion 10 near position B than near position A, the following will be appreciated: In the case that the time taken for the article conveyor portion 10 to move from position A to position B and the time taken to move from position B to position A are the same, even if the article W does not slide in respect to the article conveyor portion 10 at point A and point B, by making the time taken for the article conveyor portion 10 to move from position A to position B longer than the time taken to move from position B to position A, the article W does not slide in respect to the article conveyor portion 10 near point A, and the article W may be made to slide in respect to the article conveyor portion 10 near point B. If the article W slides in respect to the article conveyor portion 10 near position B, the article W moves in the shifting direction (the X direction in FIG. 4) in respect to the article conveyor portion 10. Thus, with the reciprocating movement of the article conveyor portion 10, the article W will be shifted in respect to the article conveyor portion 10.

Further in this embodiment, as shown in FIGS. 5A–5E, at the time the article conveyor portion 10 is moving from position A diagonally upwards to reach position B, the article conveyor portion 10 travels at a constant speed for a predetermined time period. The acceleration in position A and position B further increases for a predetermined time period for traveling from position A to position B, when the article conveyor portion 10 travels at a constant speed in the same time period from position A to position B, rather than when it moves from position A to position B not traveling in a constant speed. Therefore, constant speed traveling of the article conveyor portion 10 in moving from position A to position B may slide the article W against the article conveyor portion 10 in the article conveying direction more effectively, namely it becomes possible to convey the article W. Further, as shown in FIG. 5C, in a constant speed travel section the acceleration in the X direction is zero, and inertial force in the X direction due to the acceleration is not applied to the article W, so that it becomes possible to move the article conveyor portion 10 from position A in the shifting direction to reach position B in a state where the article W is prevented from sliding in respect to the article conveyor portion 10 in the constant speed travel section.

According to this embodiment, by adjusting a component of movement in the article conveying direction and a component perpendicular to the above component of the moving motion of the reciprocating portion by the shape of the cam, an article conveyor device which may convey an article efficiently may be realized.

Further, by setting the article conveyor portion in a horizontal state, an article conveyor device which may convey articles more effectively may be realized.

Since the article W may be made to slide further near the second position where the article easily slides in respect to the article conveyor portion, an article conveyor device which may convey articles more effectively may be realized.

Since the article W may be made to slide still further near the second position where the article easily slides in respect to the article conveyor portion, an article conveyor device which may convey articles still more effectively may be realized.

The cam rotates with an input shaft which is made to rotate by a driving means, and comprises a cam portion formed by ribs along a rotating direction of the input shaft, and the reciprocating portion comprises a first cam follower and a second cam follower which respectively contact the rib from both sides, thus it becomes possible to surely reciprocate the article conveyor portion. Further, as a result of the cam followers being prevented from bouncing from the rib, a less noisy article conveyor device than a conventional device may be realized.

The reciprocating portion is supported by a housing using slide guides, and is guided by the slide guides to reciprocate, so that it becomes possible to prevent generation of noise at the time of the reciprocating portion reciprocates.

While the present invention has been described in detail by way of illustrative and exemplary embodiments thereof, it will be apparent to those skilled in the art to make various alterations and modifications of the invention set forth herein, without departing from the spirit of the invention. Therefore, all such alterations and modifications are construed to be included within the scope of the present invention, except insofar as limited by the prior art.

What is claimed is:

1. An article conveyor device comprising:

a reciprocating portion which is driven by a cam to reciprocate; and an article conveyor portion for conveying an article being inclined by a predetermined angle in respect to a reciprocating direction of said reciprocating portion in a vertical plane, and cooperating with said reciprocating portion;

wherein said article conveyor portion is set in a horizontal state; and wherein said article is conveyed along said article conveyor portion by a reciprocating motion of said reciprocating portion.

2. An article conveyor device as claimed in claim 1, wherein said reciprocating portion is supported on a housing by means of slide guides, and is guided by said slide guides to reciprocate.

3. An article conveyor device as claimed in claim 1, wherein at the time said article conveyor portion reciprocates from a first position diagonally upwards to reach a second position, and from said second position diagonally downwards to reach said first position, a time taken for said article conveyor portion to move from said first position to said second position, is longer than a time taken for said article conveyor portion to move from said second position to said first position.

4. An article conveyor device as claimed in claim 3, wherein said article conveyor portion travels at a constant speed for a predetermined time period while said article conveyor portion moves from said first position to said second position.

5. An article conveyor device as claimed in claim 1, wherein said cam rotates with an input shaft which is made to rotate by a driving means, and comprises a cam portion formed by ribs along a rotating direction of said input shaft, and said reciprocating portion comprises a first cam follower and a second cam follower which respectively contact said rib from both sides.

* * * * *